United States Patent

Ona et al.

(10) Patent No.: US 6,398,860 B1
(45) Date of Patent: Jun. 4, 2002

(54) SIZING AGENT COMPOSITION FOR PRINTING PAPER

(75) Inventors: Isao Ona; Hiroki Ishikawa; Tadashi Takimoto; Tsutomu Naganawa, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 18 days.

(21) Appl. No.: 09/632,578

(22) Filed: Aug. 4, 2000

(30) Foreign Application Priority Data

Aug. 31, 1999 (JP) .................................. 11-244910

(51) Int. Cl.$^7$ ................ C09D 103/08; C08K 5/544; D21H 17/13; D21H 17/59
(52) U.S. Cl. ................ 106/287.11; 106/177.1; 524/188; 162/158; 162/164.4; 162/177
(58) Field of Search ............... 106/177.1, 287.11; 524/188; 162/164.4, 177, 158

(56) References Cited

U.S. PATENT DOCUMENTS

| 4,406,738 A | * | 9/1983 | Fink et al. | ............. 162/124 |
| 5,555,500 A | | 9/1996 | Ogawa et al. | ......... 364/424.05 |
| 6,288,256 B1 | * | 11/2001 | Standke et al. | ............. 556/425 |
| 6,294,608 B1 | * | 11/2001 | Hager et al. | ............. 524/838 |

FOREIGN PATENT DOCUMENTS

| JP | 3098499 | 4/1991 | |
| JP | 4142989 | 5/1992 | ............. B41M/5/38 |
| JP | 8052589 | 2/1996 | ............. B23K/35/14 |
| JP | 3024908 | 3/2000 | ............. G11B/5/708 |
| JP | 3042280 | 5/2000 | ............. B60G/17/015 |

* cited by examiner

*Primary Examiner*—David Brunsman
(74) *Attorney, Agent, or Firm*—Patricia M. Scaduto; Timothy J. Troy

(57) ABSTRACT

A sizing agent composition for printing paper comprising (A) a water-soluble diorganopolysiloxane described by formula

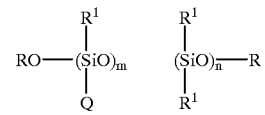

where each R is independently selected from the group consisting of a hydrogen atom, methyl group, and ethyl group, each $R^1$ is an independently selected monovalent hydrocarbon group comprising 1 to 20 carbon atoms, Q is an organic group comprising an amino group or quaternary ammonium salt, m is an integer equal to or greater than 2, n is 0 or an integer equal to or greater than 1, and (m+n) is in the range of 2 to 100;

(B) a sizing agent; and (C) water.

14 Claims, No Drawings

SIZING AGENT COMPOSITION FOR PRINTING PAPER

BACKGROUND OF INVENTION

The present invention relates to a sizing agent composition for printing paper, and more specifically relates to a sizing agent composition for printing paper which improves the printing characteristics and sheet separating characteristics of printing paper.

Conventionally, when printing is performed by an electronic copier using recycled paper, especially in the rainy season when the humidity is high, problems such as the simultaneous feeding of two sheets due to a deterioration in the sheet separating characteristics, and the breaking of printed characters due to a deterioration in the printing characteristics, are encountered. Furthermore, in cases where a facsimile transmission is performed with several sheets of facsimile paper in a stack, the transmission may be made with two or three sheets superimposed if the sheet separating characteristics are poor, so that the entire text is not transmitted. One cause of such problems is that the tacky adhesion of the sizing component (sizing agent), such as a polyvinyl alcohol, starch sizing, or carboxymethylcellulose, etc., that adheres to the surface of the paper increases as the humidity rises. In order to prevent such problems, a method has been proposed in which a polyalkylsiloxane modified by means of carboxyl groups, hydroxy groups, epoxy groups, amino groups, isocyanate groups, thioether groups, or mercapto groups, etc., is used as an offset-preventing liquid (see Japanese Patent Application Kokoku No. Sho 58-52589). Furthermore, a method in which a recording paper is coated with a pigment, a polyvinyl alcohol, and a silicone emulsion (see Japanese Patent Application Kokoku No. Hei 3-24908), a method in which a silicone oil is introduced into a thermally fusible ink layer (see Japanese Patent Application Kokai No. Hei 3-42280), and a method in which a coating liquid prepared by dissolving an organic resin and a silicone oil in an organic solvent is applied as a coating to a heat-transfer recording paper (see Japanese Patent Application Kokai No. Hei 4-142989) are also known.

However, in the case of the abovementioned method using an offset-preventing liquid, the following drawback is encountered: specifically, if copying is continued over a long period of time, the heat rolls or heating rolls become worn so that the roll surfaces become rough, thus causing a gradual deterioration in the release characteristics. Furthermore, in the case of the abovementioned method using a silicone emulsion, the emulsion is caused to break down by the numerous ingredients used, and in the case of the abovementioned method using an organic solvent, consideration must be given to the possibility of contamination of the working environment and danger of fire. Furthermore, in the case of the abovementioned methods, various types of printing papers cannot be provided with sufficient sheet separating characteristics or printing characteristics suitable for color copying. For example, even in cases where a facsimile transmission is performed by re-utilizing several receiving sheets "as is" in the facsimile machine, two or three sheets may be superimposed during the transmission so that the entire text cannot be transmitted.

Because of such problems, there is a demand for improved sheet separating characteristics and printing characteristics, and in particular, there is a demand for superior sheet separating characteristics which allow re-utilization of receiving sheets in a facsimile machine. The object of the present invention is to provide a sizing agent composition for printing paper which can provide various types of printing papers, such as papers used in black and white electronic copiers used in business applications, papers used in color copiers, papers used in ink jet printers, and receiving papers used in facsimile machines, with superior sheet separating characteristics, printing characteristics, and copying characteristics.

SUMMARY OF INVENTION

The present invention is a sizing agent composition for printing paper comprising (A) a water-soluble diorganopolysiloxane described by formula

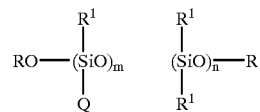

where each R is independently selected from the group consisting of a hydrogen atom, methyl group, and ethyl group, each $R^1$ is an independently selected monovalent hydrocarbon group comprising 1 to 20 carbon atoms, Q is an organic group comprising an amino group or quaternary ammonium salt, m is an integer equal to or greater than 2, n is 0 or an integer equal to or greater than 1, and (m+n) is in the range of 2 to 100;

(B) a sizing agent; and (C) water.

DESCRIPTION OF INVENTION

The present invention is a sizing agent composition for printing paper comprising (A) a water-soluble diorganopolysiloxane described by formula (Chemical Formula 1)

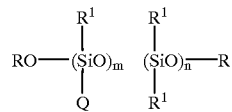

where each R is independently selected from the group consisting of a hydrogen atom, methyl group, and ethyl group, each $R^1$ is an independently selected monovalent hydrocarbon group comprising 1 to 20 carbon atoms, Q is an organic group comprising an amino group or quaternary ammonium salt, m is an integer equal to or greater than 2, n is 0 or an integer equal to or greater than 1, and (m+n) is in the range of 2 to 100;

(B) a sizing agent; and (C) water.

To describe the respective components of the present invention in detail, component (A) is a component which not only improves the sheet separating characteristics by providing the printing paper with release characteristics, lubrication, smoothness, and anti-blocking characteristics, but also improves the water resistance by making the binder component comprising component (B) hydrophobic, and which also imparts the effect of fixing pigments to ink jet printer media and sublimation type printer media. The diorganopolysiloxane comprising component (A) is a water-soluble siloxane described by Chemical Formula 1.

In the present composition with regards to the diorganopolysiloxane, the term "water solubility" refers to the property of dissolving and dispersing in cases where 5 g of the diorganopolysiloxane is added to 100 g of water, and the resulting mixture is agitated. This may refer to dissolution into a transparent state, or uniform dispersion with some degree of turbidity. In the abovementioned Chemical Formula 1, each R is independently selected from the group consisting of a hydrogen atom, methyl group, and ethyl group. R is generally a hydrogen atom or a methyl group, and is preferably a hydrogen atom from the standpoint of water solubility. Each $R^1$ is an independently selected monovalent hydrocarbon group comprising 1 to 20 carbon atoms; with specific examples of such groups including saturated aliphatic hydrocarbon groups such as methyl, ethyl, propyl, butyl, pentyl, hexyl, heptyl, octyl, decyl, and dodecyl; unsaturated aliphatic hydrocarbon groups such as vinyl, allyl, and hexenyl; saturated alicyclic hydrocarbon groups such as cyclopentyl and cyclohexyl; aromatic hydrocarbon groups such as phenyl, tolyl, and naphthyl; aralkyl groups such as styrene and methylstyrene; and halogen-substituted hydrocarbon groups in which some of the hydrogen atoms bonded to the carbon atoms of the abovementioned groups are replaced by halogen atoms. Among these groups represented by $R^1$, methyl groups are most common. However, the groups indicated by $R^1$ need not all be the same within the molecule; combinations of two or more different types of groups may be used. Especially in cases where the present composition is used on full-color or ink jet printer papers or on sublimation type printer papers, it is desirable from the standpoints of affinity for and compatibility with printing pigments such as red, yellow, blue, and black pigments, that at least a portion of the groups represent by $R^1$ have 2 to 20 carbon atoms, preferably 6 to 15 carbon atoms, and most preferably 8 to 14 carbon atoms.

In Chemical Formula 1, Q represents an organic group comprising an amino group or quaternary ammonium salt; a group in which a nitrogen atom is bonded to a silicon atom of the principal chain via a carbon atom is desirable. In specific terms, organic groups described by the following formulae may be cited as examples.

—$R^2$—$(NHCH_2CH_2)_aNHR^3$ or

—$R^2$—$(NR^1{}_3)^+Cl^-$

In the above formulae $R^2$ represents a divalent hydrocarbon group, for example, alkylene groups such as methylene, ethylene, propylene, isopropylene, and butylene; an arylene group described by the formula —$C_6H_4$—; or an alkylene-arylene group described by the formula —$(CH_2)_2C_6H_4$—. Among these groups, propylene groups are most common. $R^3$ represents a hydrogen atom or a monovalent hydrocarbon group. Examples of monovalent hydrocarbon groups represented by $R^3$ include methyl, ethyl, propyl, phenyl, and cyclohexyl. $R^1$ is the same as described above. Subscript a is an integer from 0 to 5, with 0 or 1 being most common. Examples of organic groups containing an amino group or quaternary ammonium salt described by the abovementioned Q include groups described by the following formulae:

—$CH_2NHC_2H_4NH_2$
—$C_3H_6NHC_2H4NH_2$
—$C_3H_6NH_2$

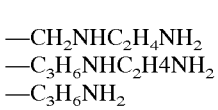

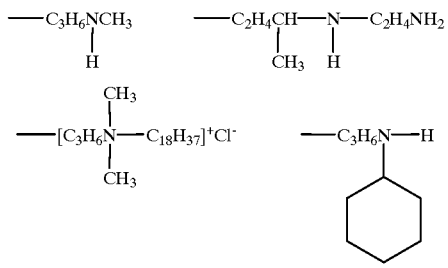

Among the above groups, a diamine type group described by formula —$(CH_2)_3NHC_2H_4NH_2$ is desirable for increasing the water solubility of this component. Subscript m is an integer equal to or greater than 2, and n is 0 or an integer equal to or greater than 1. The value of (m+n) is in the range of 2 to 100. The reason for this is that if (m+n) exceeds 100, there is a drop in water solubility. Generally, m is in the range of 2 to 90. However, it is desirable that m be in the range of 2 to 50. Furthermore, n is ordinarily in the range of 0 to 20, and is preferably in the range of 2 to 10.

In the abovementioned Chemical Formula 1, the siloxane units described by formula

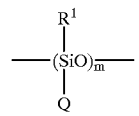

act to improve the water solubility and adhesion in cases where fillers such as titanium dioxide or kaolin are added, and to complement the pigments. The siloxane units described by formula

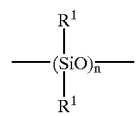

act to improve the sheet separating characteristics by imparting release characteristics and lubrication, and also act to improve the water resistance. Besides siloxane units described by formula

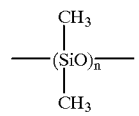

it is desirable from the standpoints of water solubility and affinity for the pigments that the abovementioned siloxane units also include siloxane units described by formula

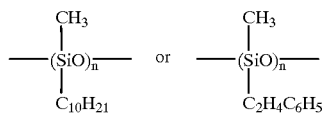

Furthermore, when siloxane units described by formula

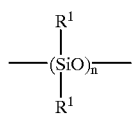

are introduce, the water solubulity generally tends to drop; depending on the object and application involved, n may be 0. Furthermore, the arrangement of these siloxane units may be a block arrangement or a random arrangement.

The diorganopolysiloxane of the present composition can be manufactured (for example) by hydrolyzing an aminopropyl(methyl)dialkoxysilane compound described by formula $H_2N(CH_2)_3Si(CH_3)(OCH_3)_2$ by adding a small amount of water or sodium hydroxide (see Japanese Patent Application Kokai No. Sho 53-98499). The hydrolysis condensation product obtained by this method is superior in terms of water solubility, and thus offers the advantage of good handling characteristics. Alternatively, the diorganopolysiloxane can be manufactured by the co-hydrolysis of the abovementioned aminopropyl(methyl)dialkoxysilane and a small amount of a dialkyldialkoxysilane described by formula $C_{12}H_{25}(CH_3)Si(OCH_3)_2$.

The following are examples of the diorganopolysiloxane comprising component (A):

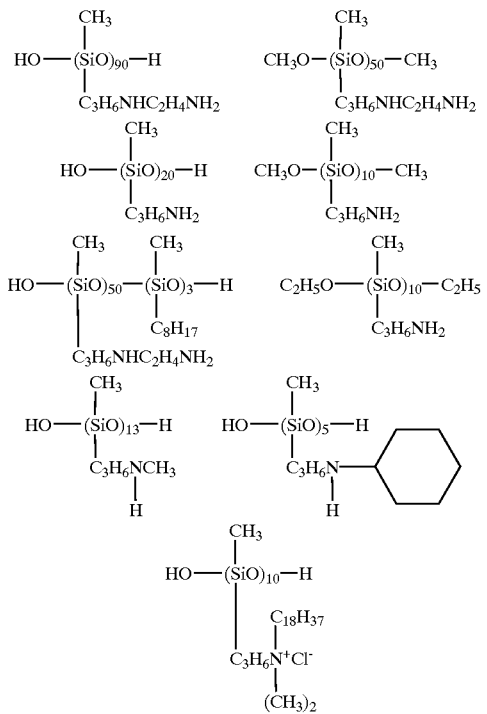

The diorganopolysiloxane comprising component (A) is dissolved or dispersed alone in water "as is"; however, in cases where high temperatures or a strong shear is involved, or in cases where a special mixture is used so that the water solubility drops, a nonionic surfactant alone or a mixture of a nonionic surfactant and a cationic surfactant may be added. Examples of nonionic surfactants that can be used include polyoxyethylene alkyl ethers, polyoxyethylene alkylphenol ethers, polyoxyalkylene alkyl esters and sorbitan alkyl esters. Quaternary ammonium salt type surfactants are most typical as cationic surfactants.

The sizing agent comprising component (B) is a binder component which is ordinarily used to fix and hold, for example, titanium dioxide, barium sulfate, diatomaceous earth, calcium carbonate, talc, kaolin, silica, alumina or a cationic polymer on the surface (one side or both sides) of, for example, electronic copier papers, coated papers used for facsimile transmission, color printing papers, and papers used as ink jet printing media. Examples of substances used as this component (B) include starches such as wheat flour, starch, corn starch, rice flour, and potato starch, as well as cellulose derivatives such as casein, carboxymethylcellulose, methylcellulose, and hydroxyethylcellulose; synthetic sizing agents such as polyvinyl alcohols and polyvinyl methyl ethers; polyacrylic acid esters that act as aqueous binders, latexes such as styrene-butadiene rubbers, and urethane emulsions. Among these substances, cellulose derivatives such as casein, carboxymethylcellulose, methylcellulose and hydroxethylcellulose, as well as polyvinyl alcohols, polyvinyl methyl ethers, and polyacrylic acid esters, are desirable, and carboxymethylcellulose, methylcellulose and polyvinyl alcohols are most desirable. Component (B) is ordinarily used after being dispersed in the water comprising component (C). Furthermore, in cases where a compound which has a surface-active effect such as a polyvinyl alcohol is used, component (A) can be dissolved in water without adding surfactants. In such cases, a uniform dispersion can be obtained by dissolving or dispersing the polyvinyl alcohol component (B) in the water component (C), adding component (A) to this, and then mixing the resulting mixture or passing the mixture through an emulsifying device.

The water comprising component (C) is used to dilute and uniformly dissolve or disperse the abovementioned components (A) and (B), and is a component that is generally necessary for applying the composition of the present invention to the surface of a printing paper as a thin coating.

The present composition consists of the abovementioned components (A) through (C); however, depending on the object and application of the printing paper involved, fillers and trifunctional aminosilanes may also be added for the purpose of increasing the strength of the printing paper. Examples of fillers that can be used include titanium dioxide, barium sulfate, diatomaceous earth, calcium carbonate, talc, kaolin, silica, alumina and cationic polymers. Examples of trifunctional aminosilanes that can be used include alkoxysilanes described by the following formulae:

$(C_2H_5O)_3SiC_3H_6NH_2$
$(CH_3O)_3SiC_3H_6NHC_2H_4NH_2$

The mixture proportions of the components in the present composition vary according to the types and amounts of additives used, and are not subject to any particular restrictions; however, it is desirable that the amount of component (A) in the composition be in the range of 3 to 40 wt %, that the amount of component (B) in the composition be in the range of 3 to 10 wt %, and that the amount of component (C) in the composition be in the range of 94 to 50 wt %. It is desirable that an original formulation of the present composition be prepared using these mixture proportions, and that a 10- to 100-fold amount of water, and (if necessary) an appropriate amount of the sizing agent of component (B), be added at the time of use.

Examples of methods which can be used to apply the present composition to a printing paper include a method in which the printing paper is immersed in a dilute solution of the composition, a method in which a dilute solution of the composition is applied to the printing paper as a coating, and a method in which the present composition is added prior to the papermaking process. Among these methods, the abovementioned coating method is most suitable, and the present composition can be applied in extremely small amounts as a thin, uniform coating by means of, for example, an air doctor coater, a blade coater, a transfer roll coater, a bar coater, or a reverse roll coater. Depending on the object and application of the printing paper involved, a multi-stage coating process consisting of two or more coating stages may be used instead of a single-stage coating process. Spraying is also possible. Furthermore, printing papers to which the present composition may be applied include not only papers consisting of virgin pulp and recycled papers, but also synthetic papers consisting of, for example, polypropylenes or polystyrenes.

Printing papers treated with the present composition prepared as described above are superior in terms of smoothness, lubrication, water resistance, and anti-blocking properties; accordingly, even in the case of high-speed continuous copying by means of an electronic copier under conditions of high humidity, there is no superimposition of sheets during printing, so that the sheet separating characteristics are extremely good. As a result, in the case of heat-sensitive facsimile paper using the present composition, facsimile transmissions can be performed by re-utilizing receiving paper "as is". Furthermore, in the case of full-color copies as well, the printing characteristics and copying characteristics are greatly improved, and the carrying of pigments is also good, so that vivid color copies can be obtained. The present composition is suitable for use not only on papers used for the recording of business information such as printing papers used in black and white or color electronic copiers and heat-sensitive papers used in facsimile machines, but also on ink jet printer media and sublimation type printer media.

Next, the present invention will be described in detail in terms of examples. In these examples, all "parts" and "%" refer to parts by weight and wt %.

WORKING EXAMPLE 1

5 g Of an amino-group-containing diorganopolysiloxane described by formula

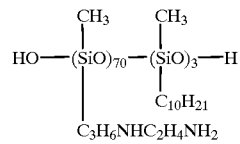

were added to 100 g of water and agitated to obtain a transparent aqueous solution. 3 Parts of a polyvinyl alcohol (1:1 mixed solution of Gosenol GL14 and GL05, commercial names of products manufactured by Nippon Gosei K. K.) and 67 parts of water were added to 30 parts of this water-soluble amino-group-containing diorganopolysiloxane, and these ingredients were uniformly dissolved and dispersed to produce a sizing agent composition. Treatment solution A was prepared by adding water to the sizing agent composition so that the composition was diluted 100 times (amino-group-containing diorganopolysiloxane 0.3%, polyvinyl alcohol 0.03%, water 99.67%). The diluted composition was uniformly sprayed onto A4 size recycled paper ("Bright Recycled Paper" manufactured by Fuji Xerox Office Supply K. K.) by means of a spray gun so that the amount of treatment solution A applied was 5 g per square meter (i. e., the amount of adhering amino-group-containing diorganopolysiloxane was 0.015 g/m$^2$, and the amount of adhering polyvinyl alcohol was 0.0015 g/m$^2$). When black and white characters and color photographs were copied by means of a full-color electronic copier (Color-628 machine manufactured by Fuji Xerox K. K.) using recycled paper treated as described above, there were no breaks in the characters or photographs and vivid copies were obtained.

COMPARATIVE EXAMPLE 1

When copying was performed in the same manner as in Working Example 1 using recycled paper that had not been treated with the abovementioned sizing agent composition, the black and white characters showed slight breaks, and the vividness of the photographs was also inferior to that of the copies obtained in Working Example 1

COMPARATIVE EXAMPLE 2

A sizing agent composition was prepared in the same manner as in Working Example 1, except that a dimethylpolysiloxane described by formula

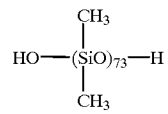

was used instead of the amino-group-containing diorganopolysiloxane used in Working Example 1. Recycled paper was treated with this composition. The recycled paper thus obtained was used in copying in the same manner as in Working Example 1. A slight dulling of colors occurred, so that vivid copies could not be obtained. It was thus demonstrated that the abovementioned dimethylpolysiloxane has a poor affinity and compatibility with full-color pigments such as red, yellow, and blue and therefore lacks the ability to combine smoothly with such pigments.

WORKING EXAMPLE 2

Treatment solution A prepared in Working Example 1 was uniformly sprayed (by means of a spray gun) onto the printing surface of a heat-sensitive facsimile recording paper (FAX-T210B-30 manufactured by Tokuyo K. K. (high sensitivity, A4 size width, continuous roll)) which had been spread and extended to a length of approximately 3 m, so that the amount of treatment solution A applied as a coating was 5 g per square meter. Afterward, this coating was dried. When the paper was subsequently rolled up and set in a facsimile machine, and a transmission consisting of three sheets of A4 size paper was received, there were no breaks in the characters, and clear printing was accomplished. Furthermore, these three received sheets were stacked and set in a facsimile machine (Speac 23TA machine manufactured by NEC K. K.), and a transmission was sent to another station. In spite of the fact that this transmission was performed at a high humidity of 87%, all three sheets were transmitted in order one at a time, and the entire text was smoothly transmitted. It was concluded from these results that printing paper treated with the composition of the present invention has improved smoothness and lubrication, and shows a decrease in tack, so that the paper has superior sheet separating characteristics.

COMPARATIVE EXAMPLE 3

Three sheets of heat-sensitive facsimile recording paper that had not been treated with the abovementioned sizing agent composition prepared in Working Example 1 were stacked and transmitted several times by means of a facsimile machine in the same manner as in Working Example 2. As a result, the three sheets remained superimposed during transmission, or, even if the first sheet was smoothly transmitted, the second and third sheets remained superimposed during transmission, so that the entire text could not be transmitted.

WORKING EXAMPLE 3

5 g Of an amino-group-containing diorganopolysiloxane described by formula

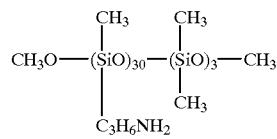

were added to 100 g of water and this mixture was agitated, whereupon the diorganopolysiloxane was uniformly dissolved and dispersed, with a slight white clouding of the dispersion. 80 Parts of an aqueous solution of methylcellulose (aqueous solution produced by mixing 5 parts of methylcellulose and 75 parts of water, and uniformly dissolving and dispersing this mixture over a period of 2 hours) were added to 20 parts of the abovementioned water-soluble amino-group-containing diorganopolysiloxane, and this mixture was agitated for 2 hours, thereby producing a sizing agent composition. Treatment solution B was prepared by diluting this sizing agent composition with a 20-fold amount of water. Treatment solution B was uniformly sprayed (by means of a spray gun) onto the printing surface of a heat-sensitive facsimile recording paper (FAX-T210B-30 manufactured by Tokuyo K. K. (high sensitivity, A4 size width, continuous roll)) which had been spread and extended to a length of approximately 3 m, so that the amount of treatment solution B applied as a coating was 5 g per square meter. This coating was dried (the amount of adhering amino-group-containing diorganopolysiloxane was 0.05 g/m², and the amount of adhering methylcellulose was 0.0125 g/m²). Subsequently, the paper was rolled up and placed in a facsimile machine and a transmission of 3 A4 size sheets was received. The characters were clearly printed with no breaks. The three sheets that were received were stacked and set in a facsimile machine (Speac 23TA machine manufactured by NEC K. K.), and a transmission was sent to another station. In spite of the fact that this transmission was performed at a high humidity of 87%, all three sheets were transmitted in order one at a time, and the entire text was smoothly transmitted. It was concluded from these results that printing paper treated with the composition of the present invention has improved smoothness and lubrication, and shows a decrease in tack, so that the paper has superior sheet separating characteristics.

WORKING EXAMPLE 4

5 g Of an amino-group-containing diorganopolysiloxane described by formula

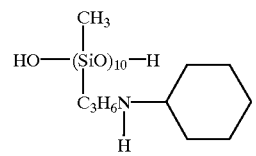

were added to 100 g of water, and this mixture was agitated, whereupon the diorganopolysiloxane was uniformly dissolved and dispersed, with a slight white clouding of the dispersion. 3 Parts of carboxymethylcellulose (commercial name: Cellogen WS-A, manufactured by Daiichi Kogyo Seiyaku K. K.) and 67 parts of water were added to 30 parts of the abovementioned water-soluble amino-group-containing diorganopolysiloxane, and the resulting mixture was uniformly dissolved and dispersed to produce a sizing agent composition. Treatment solution C was prepared by diluting this sizing agent composition with a 100-fold amount of water. Treatment solution C was uniformly sprayed (by means of a spray gun) onto the printing surface of a heat-sensitive facsimile recording paper (FAX-T210B-30 manufactured by Tokuyo K. K. (high sensitivity, A4 size width, continuous roll)) which had been spread and extended to a length of approximately 3 m, so that the amount of treatment solution C applied as a coating was 5 g per square meter. Afterward, this coating was dried. Subsequently, the paper was rolled up and placed in a facsimile machine, and a transmission of 3 A4 size sheets was received. The received characters were clearly printed with no breaks. The three sheets that were received were stacked and placed in a facsimile machine (Speac 23TA machine manufactured by NEC K. K.), and a transmission was sent to another station. In spite of the fact that this transmission was performed at a high humidity of 87% all three sheets were transmitted in order one at time, and the entire text was smoothly transmitted. It was concluded from these results that printing paper treated with the composition of the present invention has improved smoothness and lubrication, and show a decrease in tack, so that the paper has superior sheet separating characteristic.

We claim:

1. A sizing agent composition for printing paper comprising (A) a water-soluble diorganopolysiloxane described by formula $$\text{RO}-(\text{SiO})_m\underset{\underset{Q}{|}}{\overset{\overset{R^1}{|}}{|}}(\text{SiO})_n\overset{\overset{R^1}{|}}{\underset{\underset{R^1}{|}}{|}}-\text{R}$$

where each R is independently selected from the group consisting of a hydrogen atom, methyl group, and ethyl group, each $R^1$ is an independently selected monovalent hydrocarbon group comprising 1 to 20 carbon atoms, Q is an organic group comprising an amino group or quaternary ammonium salt, m is an integer equal to or greater than 2, n is 0 or an integer equal to or greater than 1, and (m+n) is in the range of 2 to 100;

(B) a sizing agent; and (C) water.

2. A composition according to claim 1, where at least a portion of the groups represented by $R^1$ comprise 2 to 20 carbon atoms.

3. A composition according to claim 2, where $R^1$ comprises 8 to 14 carbon atoms.

4. A composition according to claim 1, where Q is a diamine group.

5. A composition according to claim 4, where the diamine is described by formula $-(CH_2)_3NHC_2H_4NH_2$.

6. A composition according to claim 1, where m is in the range of 2 to 90.

7. A composition according to claim 1, where n is in the range of 2 to 10.

8. A composition according to claim 1, where component (A) is selected from the group consisting of diorganopolysiloxanes represented by formulae

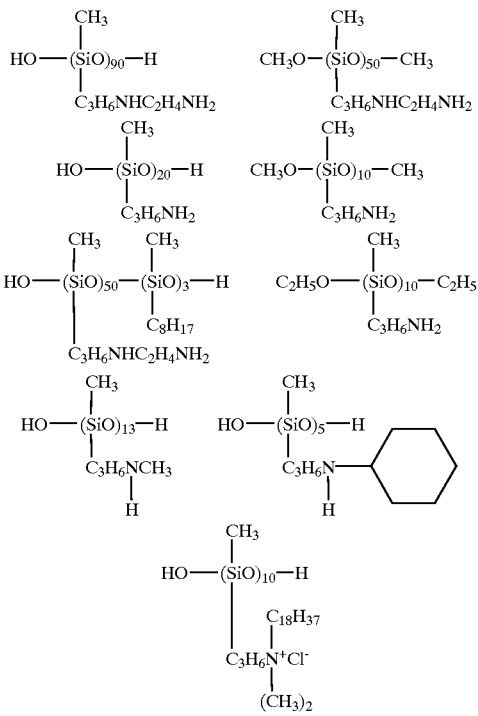

9. A composition according to claim 1, where component (A) is described by formula

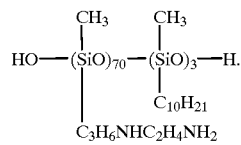

10. A composition according to claim 1, where component (A) is described by formula

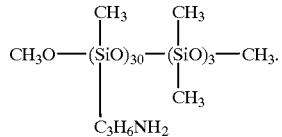

11. A composition according to claim 1, where component (A) is described by formula

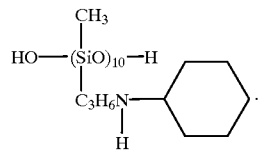

12. A composition according to claim 1, where component (B) is selected from the group consisting of cellulose derivatives, polyvinyl alcohols, polyvinyl methyl ethers, and polyacrylic acid esters.

13. A composition according to claim 1, where component (B) is selected from the group consisting of carboxymethylcellulose, methylcellulose, and polyvinyl alcohols.

14. A composition according to claim 1 comprising 3 to 40 weight percent component (A), 3 to 10 weight percent component (B), and 50 to 94 weight percent component (C).

* * * * *